United States Patent
Masurekar et al.

(10) Patent No.: US 9,755,903 B2
(45) Date of Patent: Sep. 5, 2017

(54) REPLICATING FIREWALL POLICY ACROSS MULTIPLE DATA CENTERS

(71) Applicant: Nicira, Inc., Palo Alto, CA (US)

(72) Inventors: Uday Masurekar, Sunnyvale, CA (US); Kaushal Bansal, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 14/811,382

(22) Filed: Jul. 28, 2015

(65) Prior Publication Data

US 2017/0004192 A1  Jan. 5, 2017

Related U.S. Application Data

(60) Provisional application No. 62/187,123, filed on Jun. 30, 2015.

(51) Int. Cl.
*H04L 12/24* (2006.01)
*H04L 29/06* (2006.01)
(Continued)

(52) U.S. Cl.
CPC .......... *H04L 41/0846* (2013.01); *G06F 9/445* (2013.01); *G06F 9/455* (2013.01); *G06F 9/45558* (2013.01); *G06F 17/30557* (2013.01); *G06F 17/30575* (2013.01); *H04L 63/0218* (2013.01); *H04L 63/0227* (2013.01); *H04L 63/0263* (2013.01); *H04L 63/20* (2013.01);
(Continued)

(58) Field of Classification Search
CPC .......... G06F 17/30575; H04L 67/1095; H04L 63/20; H04L 63/0227; H04L 41/0846; H04L 63/0218; H04L 63/0263
See application file for complete search history.

(56) References Cited

U.S. PATENT DOCUMENTS 5,968,176 A   10/1999 Nessett et al.
6,154,775 A * 11/2000 Coss ...................... H04L 29/06
                                                    709/221
(Continued)

OTHER PUBLICATIONS

Non-Published Commonly Owned U.S. Appl. No. 15/386,214, filed Dec. 21, 2016, 85 pages, Nicira, Inc.
(Continued)

*Primary Examiner* — Joseph P Hirl
*Assistant Examiner* — J. Brant Murphy
(74) *Attorney, Agent, or Firm* — Adeli LLP

(57) ABSTRACT

A method of replicating firewall rules across a group of data centers. Each data center includes a set of hosts and a network manager. Each host is configured to host a set of data compute nodes (DCNs). The method identifies a first DCN on a host in a primary data center. The first DCN is associated with a set of global firewall rules utilizing unique identifiers recognized by the network manager of each data center. The method allocates storage for a second DCN on a host in a secondary data center to replicate the first DCN. The method replicates the set of global firewall rules associated with the first DCN into the storage allocated for the second DCN. The method receives an indication that the second DCN is powered on. The method enforces the set of global firewall rules for the second DCN by using the replicated global firewall rules.

22 Claims, 16 Drawing Sheets

(51) Int. Cl.
  *G06F 17/30* (2006.01)
  *H04L 29/08* (2006.01)
  *G06F 9/445* (2006.01)
  *G06F 9/455* (2006.01)

(52) U.S. Cl.
  CPC .. *H04L 67/1095* (2013.01); *G06F 2009/4557* (2013.01)

(56) References Cited

U.S. PATENT DOCUMENTS

| | | | |
|---|---|---|---|
| 6,219,786 B1 * | 4/2001 | Cunningham | H04L 12/2602 709/229 |
| 7,032,022 B1 * | 4/2006 | Shanumgam | H04L 41/0893 707/999.009 |
| 7,657,887 B2 * | 2/2010 | Kothandaraman | H04L 67/06 717/170 |
| 7,676,836 B2 | 3/2010 | Prigent et al. | |
| 7,724,740 B1 | 5/2010 | Wang et al. | |
| 7,831,826 B2 | 11/2010 | Koti et al. | |
| 7,894,480 B1 | 2/2011 | Wang et al. | |
| 7,954,143 B2 | 5/2011 | Aaron | |
| 8,032,933 B2 | 10/2011 | Turley et al. | |
| 8,365,294 B2 | 1/2013 | Ross | |
| 8,813,209 B2 | 8/2014 | Bhattacharya et al. | |
| 9,047,109 B1 | 6/2015 | Wang et al. | |
| 9,130,901 B2 | 9/2015 | Lee | |
| 9,215,210 B2 | 12/2015 | Raman et al. | |
| 9,215,213 B2 | 12/2015 | Bansal et al. | |
| 9,215,214 B2 | 12/2015 | Bansal et al. | |
| 9,276,904 B2 | 3/2016 | Bansal et al. | |
| 9,367,257 B2 | 6/2016 | Hamilton et al. | |
| 9,479,464 B1 | 10/2016 | Wange et al. | |
| 2002/0078370 A1 * | 6/2002 | Tahan | H04L 63/0263 726/11 |
| 2003/0041266 A1 * | 2/2003 | Ke | H04L 12/4641 726/15 |
| 2003/0126468 A1 * | 7/2003 | Markham | H04L 63/0218 726/13 |
| 2003/0226027 A1 * | 12/2003 | Marquet | H04L 63/0263 726/11 |
| 2004/0177276 A1 | 9/2004 | MacKinnon et al. | |
| 2005/0210291 A1 | 9/2005 | Miyawaki et al. | |
| 2006/0129808 A1 * | 6/2006 | Koti | H04L 63/0218 713/166 |
| 2006/0195896 A1 | 8/2006 | Fulp et al. | |
| 2008/0082977 A1 | 4/2008 | Araujo et al. | |
| 2008/0115190 A1 * | 5/2008 | Aaron | H04L 63/102 726/1 |
| 2008/0189769 A1 * | 8/2008 | Casado | G06F 21/6281 726/4 |
| 2009/0007251 A1 | 1/2009 | Abzarian et al. | |
| 2009/0249438 A1 * | 10/2009 | Litvin | H04L 63/0263 726/1 |
| 2009/0249472 A1 | 10/2009 | Litvin et al. | |
| 2009/0276771 A1 | 11/2009 | Nickolov et al. | |
| 2009/0327198 A1 | 12/2009 | Farah | |
| 2010/0037310 A1 * | 2/2010 | Turley | H04L 63/0263 726/13 |
| 2010/0037311 A1 | 2/2010 | He et al. | |
| 2010/0043067 A1 | 2/2010 | Varadhan et al. | |
| 2011/0016467 A1 | 1/2011 | Kane | |
| 2011/0072486 A1 | 3/2011 | Hadar et al. | |
| 2011/0103259 A1 | 5/2011 | Aybay et al. | |
| 2011/0113467 A1 | 5/2011 | Agarwal et al. | |
| 2011/0213875 A1 | 9/2011 | Ferris et al. | |
| 2011/0302647 A1 | 12/2011 | Bhattacharya et al. | |
| 2012/0042033 A1 | 2/2012 | Ayala, Jr. et al. | |
| 2012/0137199 A1 | 5/2012 | Liu | |
| 2012/0240182 A1 | 9/2012 | Narayanaswamy et al. | |
| 2012/0291024 A1 | 11/2012 | Barabash et al. | |
| 2012/0314617 A1 | 12/2012 | Erichsen et al. | |
| 2013/0007740 A1 | 1/2013 | Kikuchi et al. | |
| 2013/0019277 A1 | 1/2013 | Chang et al. | |
| 2013/0031544 A1 | 1/2013 | Sridharan et al. | |
| 2013/0047151 A1 | 2/2013 | Sridharan et al. | |
| 2013/0074066 A1 | 3/2013 | Sanzgiri et al. | |
| 2013/0125230 A1 | 5/2013 | Koponen et al. | |
| 2013/0198355 A1 | 8/2013 | Kalyanaraman et al. | |
| 2013/0219384 A1 | 8/2013 | Srinivasan et al. | |
| 2013/0311612 A1 | 11/2013 | Dickinson | |
| 2014/0149794 A1 | 5/2014 | Shetty et al. | |
| 2014/0245423 A1 * | 8/2014 | Lee | H04L 63/0218 726/12 |
| 2014/0282855 A1 | 9/2014 | Clark et al. | |
| 2014/0282889 A1 | 9/2014 | Ishaya et al. | |
| 2014/0297780 A1 | 10/2014 | Zhou et al. | |
| 2014/0325037 A1 | 10/2014 | Elisha | |
| 2015/0052521 A1 | 2/2015 | Raghu | |
| 2015/0112933 A1 * | 4/2015 | Satapathy | G06F 17/30575 707/634 |
| 2015/0193466 A1 | 7/2015 | Luft | |
| 2015/0229641 A1 | 8/2015 | Sun et al. | |
| 2016/0094643 A1 | 3/2016 | Jain et al. | |
| 2016/0105333 A1 | 4/2016 | Lenglet et al. | |
| 2016/0149863 A1 | 5/2016 | Walker et al. | |
| 2016/0156591 A1 | 6/2016 | Zhou et al. | |
| 2016/0182454 A1 | 6/2016 | Phonsa et al. | |
| 2016/0191570 A1 | 6/2016 | Bansal et al. | |
| 2016/0241702 A1 * | 8/2016 | Gorajala Chandra | H04M 1/72533 |

OTHER PUBLICATIONS

Non-Published Commonly Owned U.S. Appl. No. 15/386,207, filed Dec. 21, 2016, 86 pages, Nicira, Inc.

* cited by examiner

REPLICATING FIREWALL POLICY ACROSS MULTIPLE DATA CENTERS

CLAIM OF BENEFIT TO PRIOR APPLICATIONS

This application claims the benefit of U.S. Provisional Patent Application 62/187,123, filed Jun. 30, 2015. U.S. Provisional Patent Application 62/187,123 is incorporated herein by reference.

BACKGROUND

As the need for data center resources increases, the existing data centers cannot scale to the same level. Customers intend to move a set of applications to new physical hosts at different data centers. In addition, it is desirable to transition applications from one zone to another. For instance, customers like to move applications from staging to production, where staging servers and the production servers are located in different data centers and are managed by different compute and network management entities.

Existing firewall management solutions provide firewall protection in a single data center. Different data center sites typically have different management solutions for site-local firewall management. As such, there are no solutions available for centralized management of firewall across data centers where one site can request or set firewall policies on another sites.

BRIEF SUMMARY

Some embodiments support live migration of a virtual machine (VM) from a source host in a data center to a destination host in a different data center. Each data center includes a network manager server. Prior to the migration of the VM, a group of network manager servers are identified to participate in support of live VM migrations in a multi data center environment. Firewall rules are received at one of the network managers that is designated as the primary network manager. The firewall rules are replicated to other network managers.

When a VM is identified to do live migration from a source host in a source data center to a destination host in a destination data center, the active state of the VM's firewall sessions are transferred to the destination host. Other active states of the VM such as the active memory and the execution state are also transferred to the destination host. The VM is then powered up on the destination host. The firewall rules are enforced using the session states of the active firewall sessions and the replicated firewall rules.

Some embodiments replicate firewall rules to network managers across a group of data centers. A VM is identified on a host in a primary data center to replicate to a host in a secondary data center. For instance, it is desirable to provide a disaster recovery plan for one or more critical VMs in a data center. Storage for the VM is allocated in the secondary data center. Mapping of compute and network resources required for the VM are transferred to the secondary data center. The global firewall rules for the identified VM are replicated to the network manager at the secondary data center.

When the VM has to start running on the secondary data center (e.g., the VM in the primary data center is crashed or is taken offline), network connections for the VM are established at the secondary data center based on the network mapping of the VM. Similarly, compute resources are allocated to the VM based on the compute resource mappings. The VM is then powered on at the secondary data center. The firewall rules are enforced using the replicated firewall rules. The active sessions of the VM on the primary data center are lost.

In some embodiments, the VMs of a tenant are spread across multiple data centers that are managed by different compute manager servers and network manager servers. The compute manager servers of data centers operate in the linked mode that allows the servers to share information. The firewall rules typically include several tuples and an action. The tuples refer to different objects that may or may not be recognizable by each network manager. Each network manager typically recognizes the objects that are locally managed by the local compute and network managers.

The objects referenced in firewall rules are categorized into two groups. The first group of objects includes objects with identifiers that are recognized by the local network manager. The second group of objects includes objects with identifiers that are not recognized by the local network manager. The first group of objects is translated by searching a first inventory of objects that maps the identifiers of the first group of objects into a first set of identifiers that are recognized by the network managers of every data center. The first inventory of objects in each data center is an inventory of the locally defined and recognized objects for that data center. The second group of objects is translated by searching a second inventory of objects that maps the identifiers of the second group of objects into a second set of identifiers that are recognized by the network managers of every data center. The second inventory of objects is an inventory of the globally defined objects. The firewall rules are translated into a set of firewall rules that use the first and second sets of identifiers. The translated firewall rules are replicated to all network managers across the data centers.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a mechanism to federate firewall management such that the management plane solution of one site can push firewall policies proactively to the management plane of another site. Also, the management plane of one site can reactively request and implement firewall policies from the management plane of another site. Some embodiments use federated grouping object translation where one single object might show different views within local sites. The management plane of site A, however, can request views from other sites and create a global view of the objects. This request need not be to all sites. Instead the request can be based on the needs of the site that makes the request.

I. Replicating Firewall Rules for Workload Relocation Across Data Centers

Some embodiments support live migration of a VM from a source host in a data center to a destination host in another data center. The active memory and the execution state of the VM are made available to the destination host. In addition, the network connections for the VM are preserved. In some embodiments, the firewall rules and session states of the active firewall sessions are also preserved when a VM is moved across data centers.

A. Firewall Support for Moving Workload Across Data Centers

Figure 1:
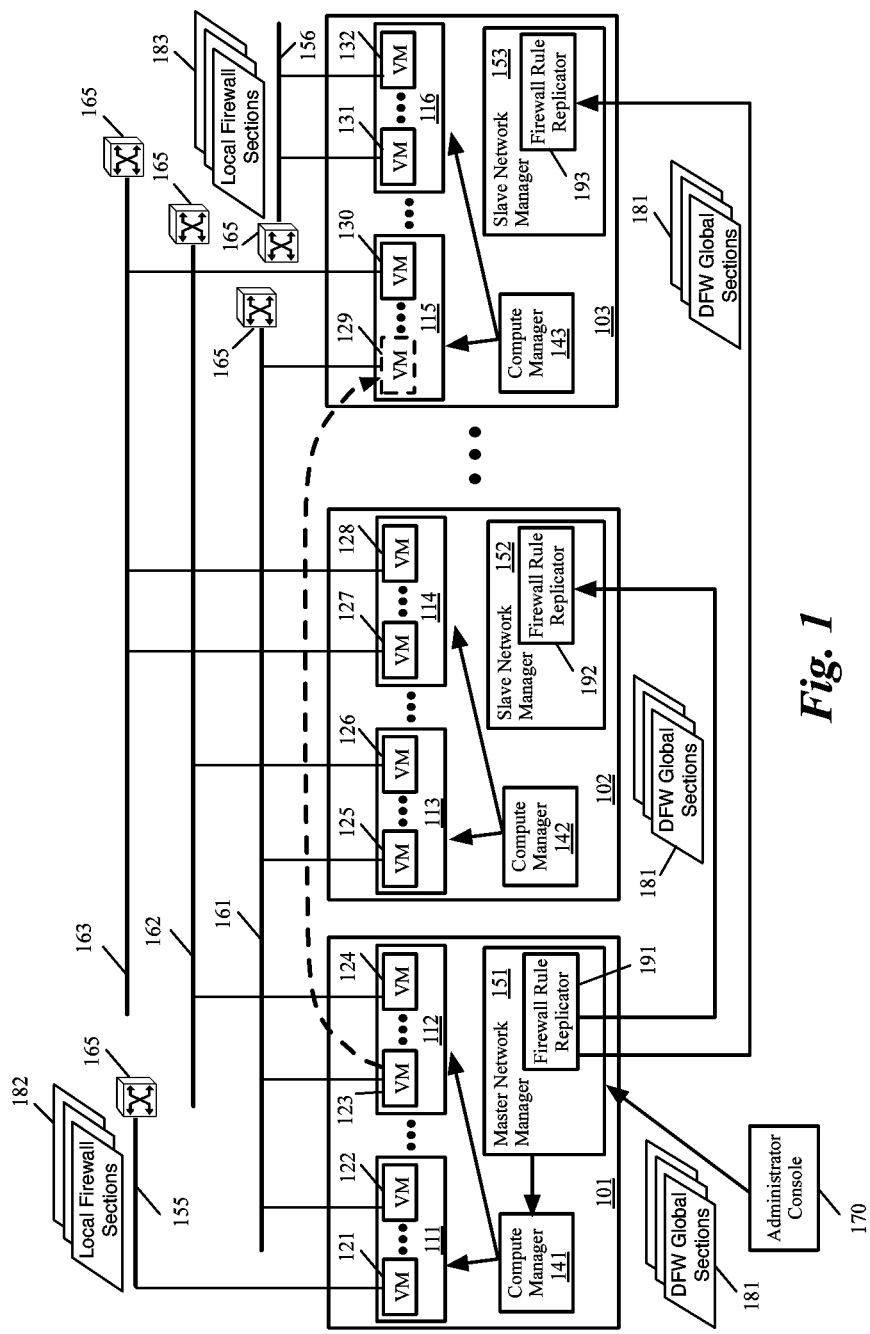
FIG. 1 conceptually illustrates replicating firewall rules for live migration of a VM in some embodiments.

FIG. 1 conceptually illustrates replicating firewall rules for live migration of a VM in some embodiments. The figure shows several data centers 101-103. A data center is a facility that houses computing resources, networking resources, and the associated components for one or more tenants (or customers). Each data center includes a set of hosts 111-116.

Each host includes virtualization software or hypervisor (not shown) and hosts a set of VMs 121-132. In some embodiments, the virtualization software includes a physical forwarding element (PFE) such as a virtual switch. In the virtualization field, some refer to software switches as virtual switches as these are software elements. However, in this specification, the software forwarding elements are referred to as physical forwarding elements (PFEs), in order to distinguish them from logical forwarding elements (LFEs), which are logical constructs that are not tied to the physical world. In other words, the software forwarding elements are referred to as PFEs because they exist and operate in the physical world, whereas LFEs are a logical representation of a forwarding element that is presented to a user when designing a logical network. In some embodiments, several PFEs are distributed throughout the network implement tenant's LFEs, where each PFE is a local instantiation of an LFE that operate across different host machines and can perform L2/L3 packet forwarding between VMs on the host machine or on different host machines. An LFE is sometimes referred to as a virtual distributed switch (VDS). In some embodiments, an LFE spans across multiple data centers.

Each data center includes a compute manager 141-143. Each data center also includes a network manager 151-153. The compute manager is a virtualized server that is installed on one or more physical servers. The compute manager is used to manage compute infrastructure of a data center. The network manager is a virtualized server that is installed on one or more physical servers and is used to define and/or manage the networking resources of a data center. The hosts are physical servers that include virtualization software (or hypervisor). VMs and guest operating systems are installed on the hosts.

The compute managers 141-143 operate in a linked mode that allows the servers to share information. Each server can connect to the other server's system and view and/or manage the inventories of the other server.

Different embodiments support different network connections. Some embodiments utilize a stretched Open Systems Interconnection (OSI) model Layer 2 (L2) network using physical routers. Other embodiments utilize virtual local area network (VLANs). Other embodiments define logical wires (or logical switches) that stretch an overlay network across multiple data centers.

In the embodiment shown in FIG. 1, logical switches are defined as global (or long) logical wires that span across multiple data centers. As shown, three such global logical wires 151-153 are defined to connect different VMs across different data centers 101-103. The routing in some embodiments is provided by global virtual distributed router (VDR) 165. A VDR provides a one-hop routing that enables a packet to be sent between two LFEs without going through a gateway. U.S. patent application Ser. No. 14/137,862, filed on Dec. 20, 2013, now published as U.S. Patent Publication 2015/0106804, entitled Logical Router, provides further details about a VDR. The content of U.S. patent application Ser. No. 14/137,862, now published as U.S. Patent Publication 2015/0106804, is incorporated herein by reference. Several LFEs connect to a VDR. The VDR in some embodiments is implemented by including a local instantiation of the VDR in each virtualization software that connects to the VDR. At the data path, the VDR instance on each virtualization software forwards the traffic from a local VM to a remote VM of another virtual switch directly without going through a gateway. A global VDR in some embodiments spans across several data centers.

In some embodiments, a system administrator creates and connects VMs across multiple data centers 101-103 using the global logical wires (or global logical switches) 161-163. As shown, VMs 122, 123, 125, and 129 are connected together along the logical line 161. VMs 124 and 126 are connected together along the logical line 162. VMs 127, 128, and 130 are connected together along the logical line 163. In addition, the figure shows several VMs 121, 131, and 132, which are not connected to global logical lines. These VMs only require connectivity within a single data center and are connected to local logical wires 155 or 156. Although the network in FIG. 1 is shown using logical wires, the network in other embodiments utilizes a VLAN with distributed port group or a stretched L2 network using physical routers to provide connectivity between the VMs.

As shown in FIG. 1, a VM 123 is being live-migrated from host 112 in data center 101 to a host 115 in data center 103. Although the example of FIG. 1 shows a VM that is migrating from a host in the data center with the master network manager, a VM from a host in any data center 101-103 can live migrate to a host in another data center. As described below, the firewall rules as well as the session states of the active firewall sessions for VM 123 are preserved for the migration. The networking and security rules are furthermore enforced during the migration process.

Figure 2:
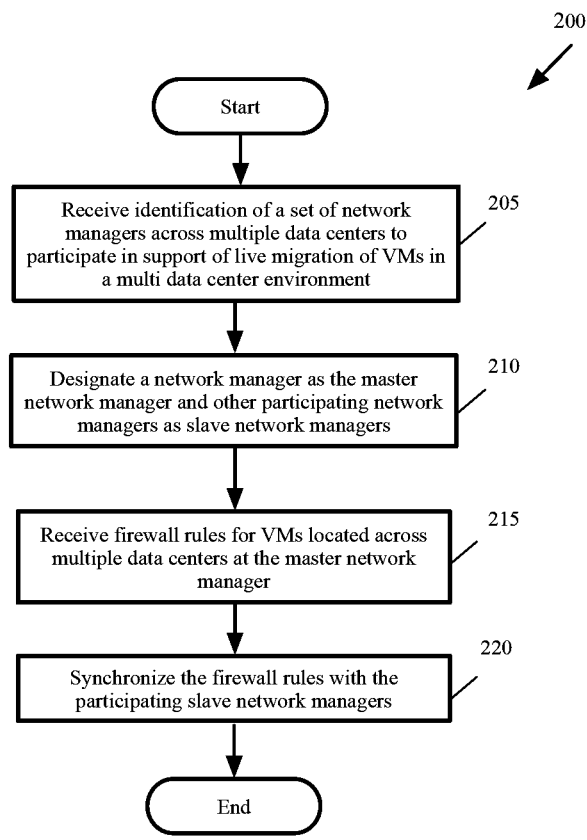
FIG. 2 conceptually illustrates a process for setting up firewall rules to support live migration of VMs in some embodiments.

FIG. 2 conceptually illustrates a process 200 for setting up firewall rules to support live migration of VMs in some embodiments. Process 200 in some embodiments is performed by a network manager server (e.g., network manager 151 in FIG. 1). As shown, the process receives (at 205) the identification of a set of network managers (such as network managers 151-153 in FIG. 1) across multiple data centers to participate in support of live migration of VMs in a multi data center environment.

The process designates (at 210) a network manager (e.g., network manager 151 in FIG. 1) as the master network manager and the other participating network managers (e.g., network managers 152-153) as the slave network managers. The process then receives (at 215) firewall rules for the VMs located across the multiple data centers at the master network manager.

For instance, in some embodiments, a system administrator or a network administrator defines the firewall rules through an administrator console (e.g., console 170 in FIG. 1). Typically, firewall rule definitions include the following five tuples: source, source port, destination, destination port, and service (or application), in addition to an action value.

In some embodiments, the firewall rules include an additional tuple (referred to herein as the AppliedTo tuple). The AppliedTo tuple lists a set of enforcement points (network nodes) at which the firewall rule has to be applied. In some embodiments, the enforcement points can be defined in terms of (1) virtual network interface cards (VNICs), VMs, hosts, or other compute constructs (e.g., compute clusters, datacenters, etc.), (2) network elements, such as physical forwarding elements (e.g., physical switches, physical routers, etc.), logical forwarding elements (e.g., logical switches, logical routers, etc.), other managed appliances, unmanaged third-party appliances (e.g., third party firewalls), and/or combination of such elements, and/or (3) security groups that are formed by a set of one or more VNICs, VMs, hosts, compute constructs and/or network constructs. For instance, an AppliedTo firewall rule can be limited (by the AppliedTo tuple) to a security group that is specified in terms of (e.g., by using the identifier of) a particular compute cluster and a particular logical network that connects a particular tenant's VMs that execute on the cluster's hosts. Security groups can be specified by users (e.g., network administrators) in some embodiments. Conjunctively, or alternatively, security groups can be specified by automated process in some embodiments. Firewall rules in some embodiments include additional tuples such as rule number and rule name. Each grouping construct has an identifier. The grouping constructs identifiers are, for example, used in the AppliedTo tuple of firewall rules.

Figure 3:
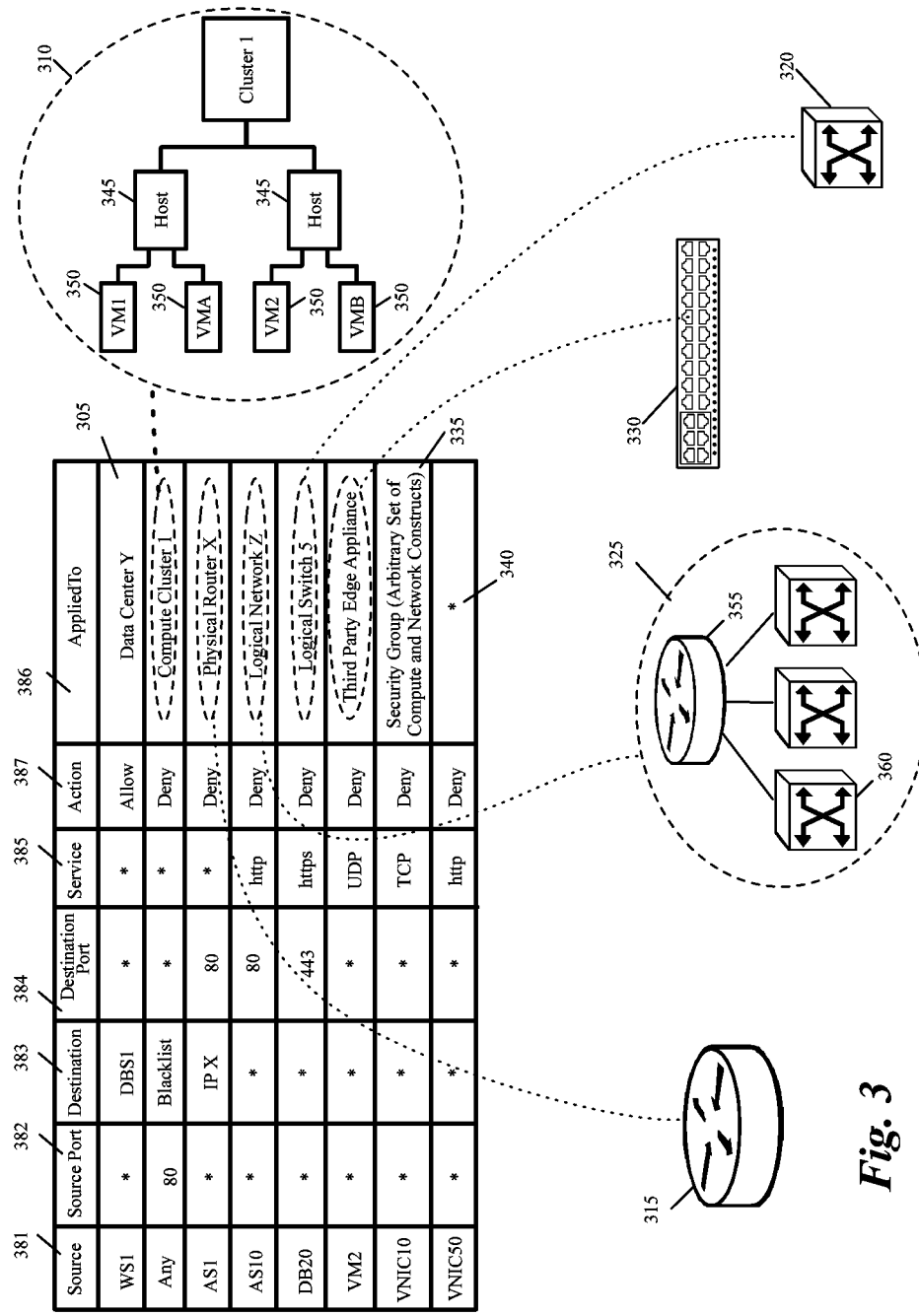
FIG. 3 illustrates several examples of firewall rules in some embodiments.

FIG. 3 illustrates several examples of firewall rules in some embodiments. Each of these rules includes the traditional five tuples, Source 381, Source Port 382, Destination 383, Destination Port 384, and Service 385, in addition to the AppliedTo tuple 386 and the Action value 387.

Source and source port identify the source of a packet that is subject to the firewall rules. Destination and destination port identify the destination of a packet that is subject to the firewall rules. The examples of service tuples include http, https, UDP, and TCP. Wildcard entries are shown by the * character.

The examples of the action include allow and deny. The examples of the AppliedTo tuples that are shown in FIG. 3 include (1) compute constructs, such as data center 305 and compute cluster 310, (2) network constructs, such as physical router 315, logical switch 320, and logical network 325, (3) third-party network appliance 330, (4) a security group 335, and (5) a wildcard entry 340.

In some embodiments, a datacenter is a location that houses multiple hosts, each of which might be dedicated to one tenant or multiple tenants. Each host might be a dedicated non-virtualized machine, or it might be a virtualized machine on which multiple VMs execute. A compute cluster is a group of hosts in a datacenter. FIG. 3 illustrates an example of a compute cluster that is formed by two hosts 345 that each executes two VMs 350. In some embodiments, each host in a compute cluster is configured to support a set of tenants, so that when a VM is instantiated on or moved to one such host, some or all of the data needed for configuring that VM and configuring the VNIC-level firewall data storage on the host already exists on the host.

FIG. 3 illustrates an example of a logical network 325 that is formed by one logical router 355 and three logical switches 360. Like logical forwarding elements, logical networks are a logical representation of a network that is presented to a user or a program in some embodiments. Although not shown in the example illustrated in FIG. 3, the AppliedTo tuple can also specify a physical network (that is formed by one or more PFEs) as an enforcement point for a firewall rule.

In some embodiments, firewall rules are placed in global sections, which are entities that are replicated across the data centers. The global firewall sections allow multiple network managers to share, replicate and remain in sync for distributed firewall rules or part of the rule configuration. The global firewall sections contain the rules that are to be replicated across multiple network managers. Some embodiments place firewall rules in a grouping construct that can include any type of network, compute, or security constructs. In some embodiments, one or more of the compute constructs, network constructs, and security constructs can be specified as dynamic grouping constructs that can have members (e.g., forwarding elements, VMs, hosts, VNICs, etc.) dynamically added and/or removed from them. In order to provide support for a multi data center work environment, some embodiments provide a set of global (or universal) grouping constructs as well as local grouping constructs. In some embodiments, a member is added to a grouping construct by adding an identifier of the member in the grouping construct.

Examples of the supported grouping construct members for source, destination, and AppliedTo rules are inline/static/raw Internet protocol (IP) addresses, inline/static/raw media access control (MAC) addresses, IPSets, MACSets, MAC addresses, and IPAddress/classless inter-domain routing (CIDR) blocks. An IPSet in some embodiments includes a set of IP addresses. A MACSet in some embodiments includes MAC addresses.

IP addresses in a CIDR block share an initial sequence of bits in the binary representation of their IP addresses. The global grouping constructs do not include members that are not uniquely resolved across the data centers. For instance, when duplicate VM names are allowed in different data centers, the VM name cannot be the member of a global grouping construct.

The members of the global grouping constructs are defined such that each member's identification is unique across all data centers that are participating in the multi data center solution. On the other hand, the members in a local grouping construct only need to be uniquely identified in the data center where the members are located. For instance, two VMs with the same identifier can exist in local grouping constructs in two different data centers. In contrast, every VM in a global grouping constructs has to be uniquely identifiable across all participating data centers.

In the example of FIG. 1, the administrator defines a set of global firewall rules using an administrator console 170 connected to the master network manager 151 and places them in a set of global sections 181 for the distributed firewall (DFW). The local firewall rules are defined locally at each data center and placed in local firewall sections 182-183 sections. Some embodiments utilize other methods for defining firewall rules. For instance, the rules may be defined at locations other than the administrator console and conveyed to the master network manager.

The global sections are replicated across multiple network managers 151-153. The global sections are read only on the slave network managers and cannot be edited on slave network manager from an API or user interface (UI).

The rule precedence across the global sections does not interfere with local sections on slave network managers. The overall precedence and ordering of the global sections are maintained. On the slave network manager, the global sections are inserted at the top of the existing sections (e.g., the default section). The administrator in some embodiments is allowed to add sections above and below a global section but that order is overridden in the next update of global sections. The grouping constructs used in the global sections are replicated on the network managers. The object definitions are not edited on the slave network managers.

Figure 4:
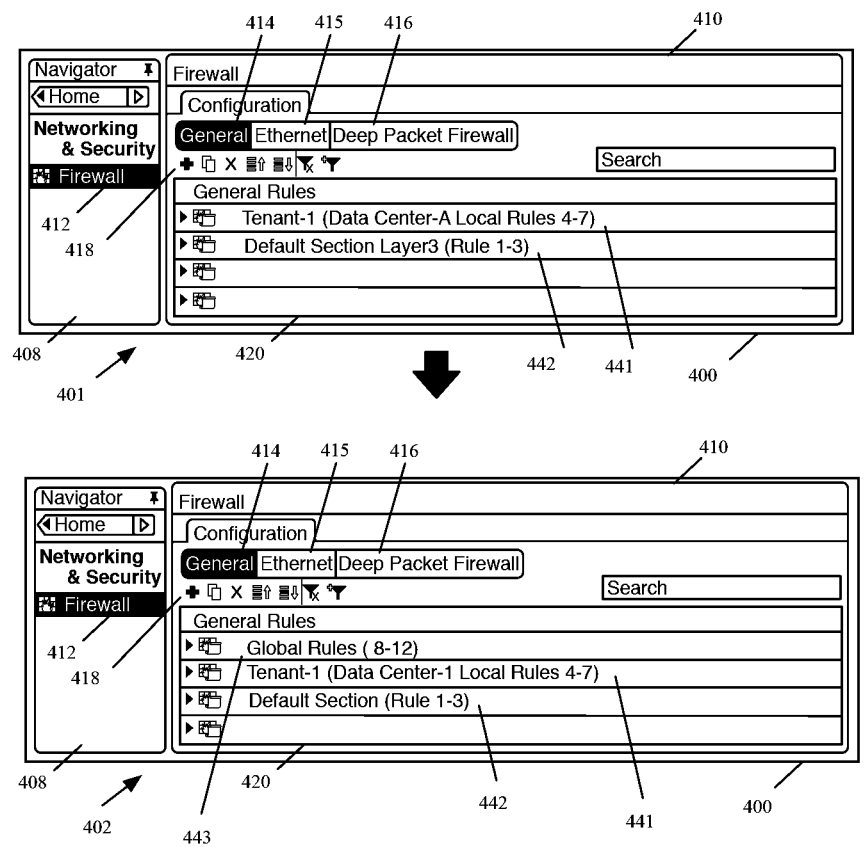
FIG. 4 illustrates the user interface (UI) of a firewall management console (in some embodiments).

FIG. 4 illustrates the user interface (UI) of a firewall management console (e.g., implemented as a part of administrator console 170 in FIG. 1) in some embodiments. The figure is shown in two operational stages 401 and 402. The first stage 401 shows a navigation section 408 and a configuration-control section 410 of this console. The navigation section 408 displays a plurality of controls (not shown) for specifying compute constructs (such as VMs, compute clusters, etc.) and specifying network constructs (such as logical switches, logical routers, etc.). In FIG. 4, the navigator section only shows the firewall control 412 as this control is germane to the firewall discussion below.

As shown, selection of the control 412 causes configuration-control section 410 to display a firewall configuration pane that displays information and UI controls relating to the firewall rules for a datacenter. The firewall configuration pane includes (1) a rule section 420 that lists the firewall rules, and (2) three tabs 414, 415, and 416 for displaying different firewall rules. This pane also has a UI control section 418 that includes (1) controls for adding firewall rules, (2) copying firewall rules, (3) deleting firewall rules, (4) moving firewall rules up and down in the rule section list being displayed, (5) applying filters to filter out rules in the rule section list that do not meet one or more filtering criteria, and (6) removing filters.

The first stage 401 shows the general rule tab 414 selected and the general firewall rules displayed in the rule section list 420. The rules are displayed in a collapsed form that shows two closed folders of firewall rules. These folders are local firewall rules 441 for a tenant and default rules 442 for the datacenter (data center A in the example of FIG. 4).

In the second stage 402, a set of global rules defined at another data center (e.g., data center 101 in FIG. 1 that includes the master network manager 151) are synchronized with the firewall rules in data center A. As shown, the global rules 443 are inserted at the top of the existing rules 441-442 and take precedence over the existing rules.

Referring back to FIG. 2, the process then synchronizes (at 220) the firewall rules with the participating slave network managers (e.g., network managers 152-153 in FIG. 1). The process then ends. As shown in FIG. 1, the master network manager 151 synchronizes the firewall global sections 181 with the slave network managers 152-153. Synchronization is done by placing the rules in global grouping constructs. The global grouping constructs are either placed in a storage location that is accessible to all network managers 151-153 or are sent from the master network manager 151 to the slave network managers 152-153. As shown, each network managers 151-153 has a firewall rule replicator 191-193, respectively. The firewall rule replicator 191 of the network manager 151 that is designated as the master network manager replicates the firewall global sections among the slave network managers. The local firewall rules 182 are not replicated across the data centers.

Instead of using a firewall rule replicator that is part of the master network manager, some embodiments utilize a process (such as a plug in) that is external to the network managers to synchronize the firewall rules. In some of these embodiments, the replicator is dedicated to replicate firewall rules across the network managers in different data centers. In other embodiments, the plug in is used to replicate all global compute, network constructs, and security sections across the multiple data centers.

As the global firewall rules are changed and updated, the global firewall sections are replicated among the participating network managers. As a result, when a VM is moved from a host in a source data center to a host in a destination data center, the network manager in the destination data center has the firewall rules for the migrating VM ahead of the migration.

Figure 5:
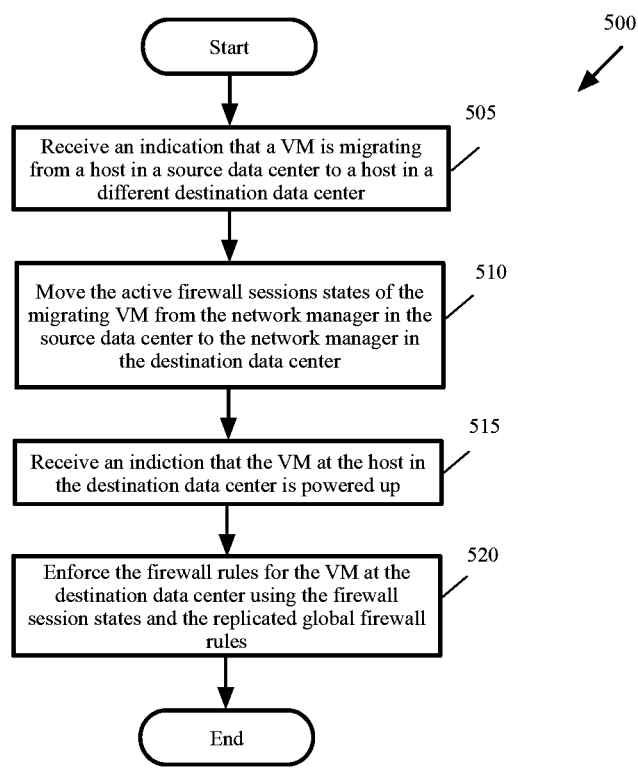
FIG. 5 conceptually illustrates a process for providing firewall support for live migration of a VM across different data centers in some embodiments.

FIG. 5 conceptually illustrates a process 500 for providing firewall support for live migration of a VM across different data centers in some embodiments. Process 500 in some embodiments is performed by a network manager server (e.g., network manager 151 in FIG. 1). As shown, the process receives (at 505) an indication that a VM is migrating from a host in a source data center to a host in a different destination data center.

The process then moves (at 510) the states of the active firewall sessions of the migrating VM from the network manager in the source data center to the network manager in the destination data center. Other examples of a VM's active state include the active memory and the execution state of the VM, which are moved during the live migration by entities other than a network manager. The process in some embodiments only replicates the rules and sections that are accessed by the rules. The sections that are not accessed by the rules are not migrated.

The process then receives (at 505) an indication that the VM at the host in the destination data center is powered up. The process then enforces (at 520) the firewall rules for the VM at the destination data center using the VM's previously synchronized global firewall rules and the firewall session states. The process then ends.

B. Firewall Policy Replication Engine

Some embodiments provide a mechanism for replicating firewall rules. In these embodiments, a destination (or recovery) site for a VM may be identified prior to any need to move the VM to the destination site. When high availability is desired for a VM that runs a critical application or data base server, some embodiments keep a cold (i.e., suspended or non-executing) recovery copy of the VM at a different host. In some embodiments, the rules are simply copied during the replication. In other embodiments, the rules are modified during the replication to be applicable to the VM at the destination site.

The VM state in the destination data center is periodically updated with the state of the active VM. When the host of the active VM has a failure and crashes, the VM at the recovery site starts running from a cold state. Although, the live data since the last update of the destination VM are lost, the quick availability of the VM at the destination data center is highly desirable.

Figure 6:
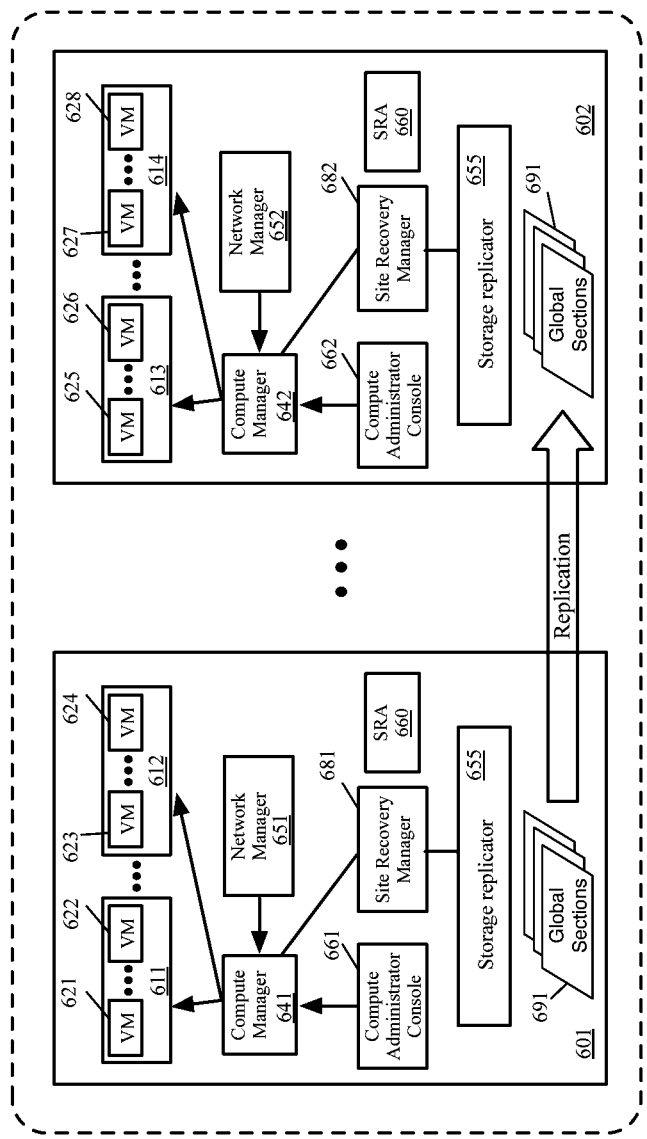
FIG. 6 conceptually illustrates replicating firewall rules for a VM in some embodiments.

Some embodiments replicate firewall rules among network managers across multiple data centers. FIG. 6 conceptually illustrates replicating firewall rules for a VM in some embodiments. The figure shows a primary data center 601 and a secondary data center 602. The primary data center 601 includes a compute manager 641, a compute manager console 661, a network manager 651, and several hosts 611-612. The hosts 611-612 host several VMs 621-624. Similarly, the secondary data center 602 includes a compute manager 642, a compute manager console 662, a network manager 652, and several hosts 613-614. The hosts 613-614 host several VMs 625-628.

The Example of FIG. 6 shows a system that replicates firewall rules to provide disaster recovery (or cold standby) for VMs. When a VM in the primary (or protected) site 601 is powered down (e.g., due to a fault), a replica VM on the secondary (or recovery) site 602 is powered on to perform the functions of the VM that is powered down. An administrator identifies (e.g., by using the administrator console 651) the critical VMs workload on the primary site 601 and enables recovery protection. This starts replication of the VMs' storage space on the destination data center 602. In alternate embodiments, administrator consoles 661, 662 are remote from datacenters 601, 602, and access compute managers 641, 642 via an application programming interface (API) or web interface exposed by the compute managers.

A site recovery manager (SRM) 681 or 682 in some embodiments facilitates the recovery for the identified VMs. The SRM provides disaster recovery (DR) for VMs. The functionality of the SRM is either integrated with the functionality of the compute manager or is provided by a separate server.

The administrator can categorize these critical VMs under different protection groups. A protection group is a group of VMs over which a SRM recovery plan can be created. The administrator also defines the mapping in terms of compute and network in order to ensure a VM has the required compute and network resources when the VMs is started on the recovery site.

The firewall rules 691 are defined similar to the embodiments described above by reference to FIGS. 1-5. One difference is the choice of grouping constructs for the rules. The global grouping constructs that are synchronized among all participating network managers do not include members that are not uniquely resolved across the data centers. For instance, when duplicate VM identifiers (e.g., duplicate VM names) are allowed in different data centers, the VM identifier cannot be the member of a global grouping construct. In case of SRM, the recovery site already has the VM replica. The administrator, therefore, can create firewall rules based on the VM identifier and synchronize the rules that include VM identifier only between the network managers of the primary and recovery sites (e.g., synchronize rules that include VM identifiers automatically by SRM software or through an administrator console using an API).

Some embodiments use a storage replicator 655 to replicate the content of a VM storage across data centers. The replicator 655 in some embodiments optionally utilizes a storage replication adapter (SRA) 660 to allow the SRM to integrate with third party storage array technology. Array-based replication provides data replication across one or more storage controller to copy large amount of data. SRAs are software modules for the SRM that are developed and supported by the third party storage providers. An SRA specific to each storage array enables SRM to work with a specific kind of array. For instance, the SRA in some embodiments is a storage vendor specific plug-in to SRM that enables interaction between SRM and the storage controller. The SRA interacts with the storage controller to discover storage arrays and their associated data stores and devices. When the administrator enables recovery protection on VM, a replica VM on the recovery site is created. As shown, the global sections (including the global firewall sections) required by the identified VMs are replicated to the secondary data center. This replica has allocated storage on the destination data center. In some embodiments, the VM name is the same on both source and destination sites. The replica VM does not have any network information until the time the replica VM is required to power up on the recovery site.

When the VM on the primary site is powered off (e.g., in a planned recovery), network interface cards (NICS) are added in the replica VM on the recovery site based on the predefined network mapping. Based on resource mapping in SRM manager, NICS are connected to the required network. The replica VM is then powered on. The existing sessions are lost in this scenario.

Different embodiments replicate firewall rules from the primary site to the secondary sites differently. For instance, in some embodiments, the same replicator that replicates the global grouping constructs for the VM replicates the global firewall grouping constructs to the secondary site. In other embodiments, mechanisms such as the firewall replicator or the replicator plug-in described by reference to FIG. 1 are used to replicate the global firewall grouping constructs. Yet other embodiments provide import and export application APIs for an administrator to export the firewall rules from the primary site or to import the firewall rule on the secondary site. The APIs only import or export the global firewall sections including the member objects with their definitions. The APIs enable the existing automations for SRM solutions that a tenant has. The APIs provide the ability to the administrators to create their own replicator or equivalent plugin. One use of these APIs is to synchronize firewall rules when duplicate VM identifiers (e.g., duplicate VM names) are allowed in different data centers. The APIs can be used to synchronize firewall rules that include VM identifiers between a primary site and an SRM recovery site as described above by reference to firewall rules 691 in FIG. 6.

Figure 7:
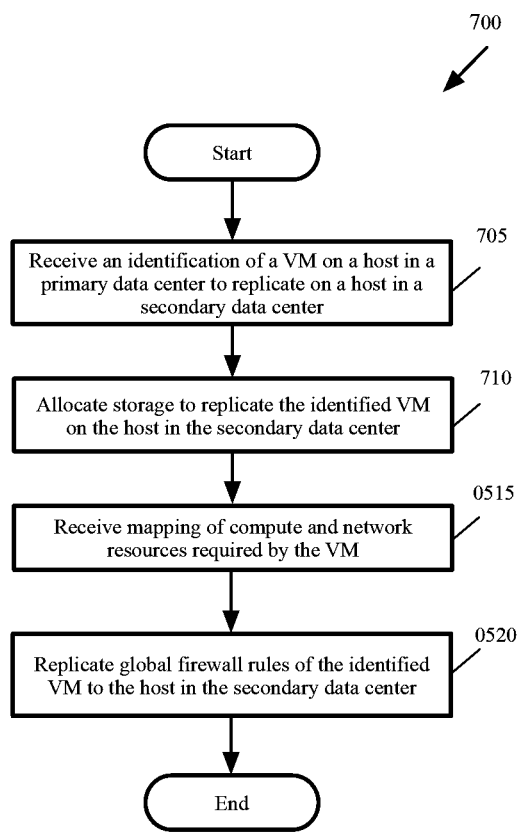
FIG. 7 conceptually illustrates a process for replicating firewall rules across multiple data centers in some embodiments.

FIG. 7 conceptually illustrates a process 700 for replicating firewall rules across multiple data centers in some embodiments. Process 700 in some embodiments is performed by a site recovery manager (e.g., site recovery manager 681 in FIG. 6). As shown, the process receives (at 705) an identification of a VM on a host at a primary data center to replicate on a host in a secondary data center.

The process then allocates (at 710) storage to replicate the identified VM on the host in the secondary data center. The process then receives (at 715) mapping of compute and network resources required by the VM. The process then replicates (at 720) global firewall rules (e.g., the global firewall sections) corresponding to the identified VM to the host in the secondary data center. The process then ends.

Figure 8:
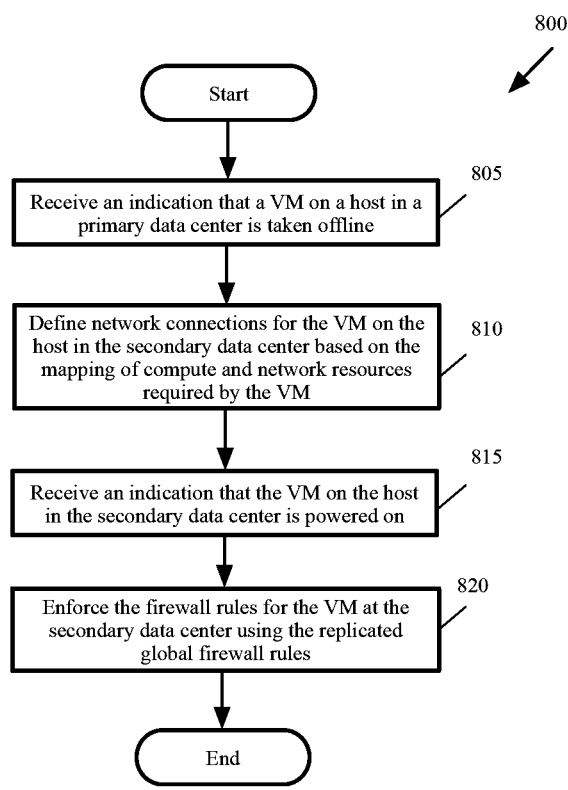
FIG. 8 conceptually illustrates a process for replicating firewall rules across different data centers in some embodiments.

FIG. 8 conceptually illustrates a process 800 for replicating firewall rules across different data centers in some embodiments. Process 800 in some embodiments is performed by a site recovery manager (e.g., site recovery manager 681 in FIG. 6). As shown, the process receives (at 805) an indication that a VM on a host in a primary data center is taken offline. The process defines (at 810) network connections for the host in the secondary data center based on the mapping of the compute and network resources required by the VM.

The process then receives (at 815) an indication that the VM on the host in the secondary data center is powered on. The process then enforces (at 820) the firewall rules for the VM at the secondary data center using the replicated global firewall rules. The process then ends.

II. Providing Firewall Rules for Workload Spread Across Multiple Data Centers

In some embodiments, the VMs of a tenant are spread across multiple data centers that are managed by multiple compute manager servers and network manager servers. The compute manager servers of data centers operate in the linked mode that allows the servers to share information. Each server can connect to the other server's system and view and/or manage the inventories of the other server.

Figure 9:
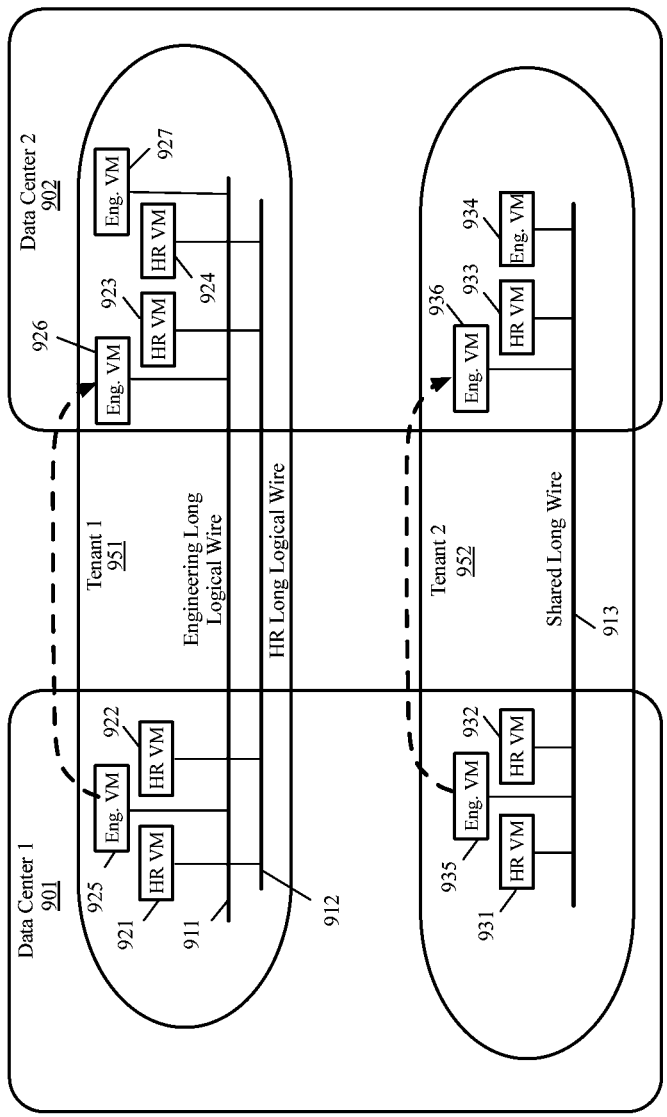
FIG. 9 conceptually illustrates a system for providing firewall rules for workload spread across multiple data centers.

FIG. 9 conceptually illustrates a system for providing firewall rules for workload spread across multiple data centers. For simplicity, the figure only shows two data centers 901 and 902. Each data center has two tenants 951 and 952. The workload for tenant 951 includes several VMs 921-924 for the human resources (HR) department and several VMs 925-927 for the engineering (Eng.) department.

Tenant 951 has defined long logical wire 911 for the engineering department VMs 0725-927 and the long logical wire 912 for the HR department VMs 921-924. The long logical wires 911 and 912 span across multiple data centers 901-902. The routing is provided by a global VDR (not shown). Tenant 951 provides micro-segmentation between the engineering department and HR department VMs.

Tenant 952 has defined only one long logical wire 913 that is shared by engineering department VMs 0735-926 as well as the HR department VMs 931-934. The long logical wires 911 and 912 span across multiple data centers 901-902. The routing is provided by a global VDR (not shown).

The VMs of each tenant can migrate along the corresponding long logical wires 911 or 912 from one data center to the other. As described below, the network and firewall session states during this live migration are preserved and networking and security are enforced during the migration. The translation process considers grouping constructs from all the datacenters while translating the grouping constructs into IP address or MAC addresses.

Figure 10:
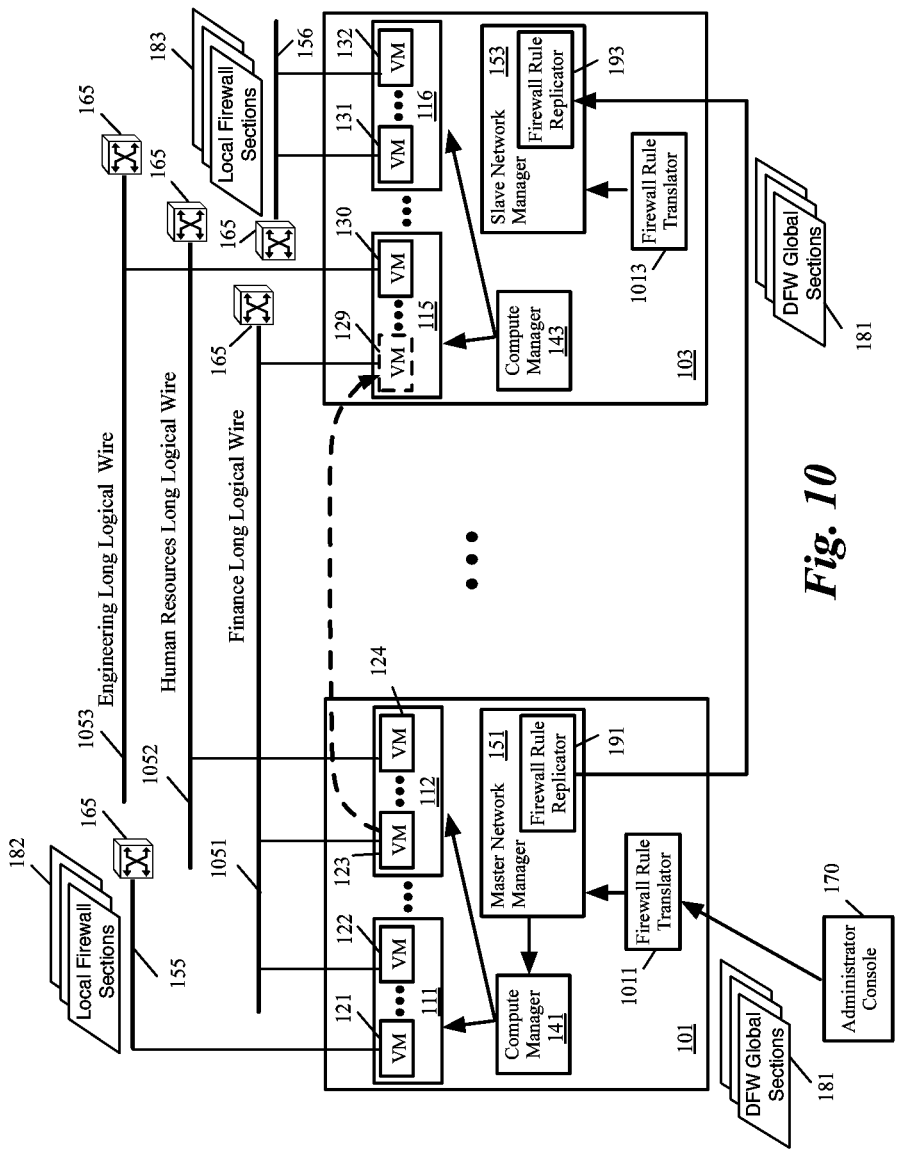
FIG. 10 conceptually illustrates replicating firewall rules for live migration of a VM when the tenant workload spreads across multiple data centers in some embodiments.

FIG. 10 conceptually illustrates replicating firewall rules for live migration of a VM when the tenant workload spreads across multiple data centers in some embodiments. As shown, three long logical wires 1051-1053 are defined for engineering, human resources, and finance department VMs. The processes for defining the firewall rules and migrating a VM from one data center to another is similar to the processes defined by reference to FIGS. 1-5, above. The only difference is in the translation of firewall rules.

As described further below, some embodiments use global firewall sections that allow multiple network managers to share, replicate and remain in sync for distributed firewall rules or part of the rule configuration. The global firewall sections contain the rules that are to be replicated across multiple network managers. The grouping constructs used in rules defined in global sections are replicated and remain synchronized across data centers. The systems described in FIGS. 1 and 10 both utilize global firewall sections. However, the system of FIG. 10 (in which the workload of a tenant is spread across multiple data centers at the same time) additionally requires that all objects (or grouping constructs) used in the global section to be globally recognizable across multiple data center. As shown, each data center 101-103 in FIG. 10 includes a translator 1011-1013. The translators in some embodiments are a process external to the network managers 151-153. In other embodiments, the translator is a function of the network managers.

In contrast, in the system of FIG. 1, the workload (either one VM as shown in FIG. 1 or multiple VMs) is simultaneously moved from a source data center to a destination data center. Once the firewall rules are moved, the complete workload will reside in one data center (i.e., the destination data center). The grouping constructs in the global firewall sections of FIG. 1, therefore, do not require translation into globally recognized objects.

A. Issues with Translation of Objects Used in Firewall Rules

A network manager such as network manager 151 or 153 can only translate grouping constructs based on the entities that are imported from the compute manager 141 or 143 to which the network manager is connected. In other words, the network manager only recognizes the entities that are managed locally by the network manager and compute manager. As a result, when a tenant defines a security group to match all the VMs belonging to the finance department, the security group will only contain the IP addresses that are locally resolvable. The tenant has to use static groups like IPSets and use them in rules defined in the global firewall section.

The following example illustrates the shortcoming of a translation process that resolves the objects in firewall rules based on the local object inventory. A typical translation service translates the objects consumed in firewall rules into a set of IP addresses, MAC addresses, and VNIC universally unique identifier (UUID) based on whether the object is used in source, destination or AppliedTo field in the firewall rule. The translation process resolves the objects used in firewall rules locally based on the objects present in the local inventory and not based on objects across multiple network managers in a multi datacenter environment. The same applies with the security groups (with static definitions) and virtual center objects.

Figure 11:
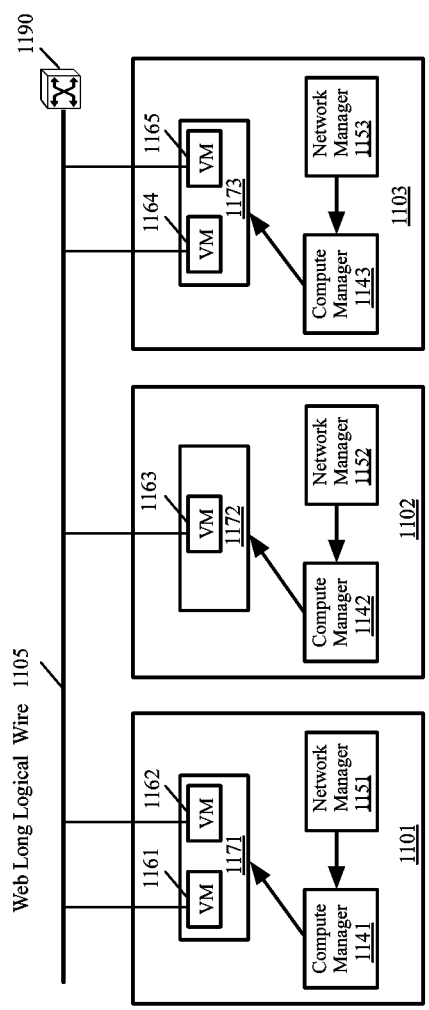
FIG. 11 conceptually illustrates a global (long) logical wire "webwire" that stretches across several data centers in some embodiments.

FIG. 11 conceptually illustrates a global (long) logical wire "webwire" that stretches to data center 1 (DC-1), data center 2 (DC-2), and data center 3 (DC-3) in some embodiments. DC-1 1101 is managed by compute manager 1 1141 and network manager 1 1151 {CM-1, NM-1}, DC-2 1102 is managed by compute manager 2 1142 and network manager 2 1152 {CM-2, NM-2}, and DC-3 1103 is managed by compute manager 3 1143 and network manager 3 1153 {CM-3, NM-3}. The VMs connected to the global webwire 1105 in DC-1 1101 are VMs 1161-1162 {web-vm-1, web-vm-2}. The VM connected to the global webwire 1105 in DC-2 1102 is VM 1163 {web-vm-3}. The VMs connected to the global webwire 1105 in DC-3 1103 are VMs 1164-1165 {web-vm4, web-vm-5}. The VMs on each data center can be hosted by one or more hosts. For simplicity, only one host 1171-1173 is shown on each data center 1101-1103. The routing is provided by global VDR 1190.

Now consider the rule defined as webwire→webwire any drop. The intention of the user is that the virtualization software on each host should have following rule on the data path:

{web-vm-1, web-vm-2, web-vm-3, web-vm4, web-vm-5}→{web-vm-1, web-vm-2, web-vm-3, web-vm4, web-vm-5} any drop The rule, however, will be realized as following across multiple datacenters. For DC-1 {CM-1, NM-1}, the rule will be:

{web-vm-1, web-vm-2}→{web-vm-1, web-vm-2} any drop

For DC-2 {CM-2, NM-2}, the rule will be:
{web-vm-3}→{web-vm3} any drop
For DC-3 {CM-3, NM-3}, the rule will be:
{web-vm-4, web-vm-5}→{web-vm-4, web-vm-5} any drop So this means webvm within the same datacenter cannot talk to each other while they can talk across datacenters, though the intention was that no webvm on this global logical switch should be able to talk to each other. This also holds true for a security group with dynamic criteria such as {web-vm*}, tags, etc.

B. Translation of Objects Used in Global Sections

Figure 12:
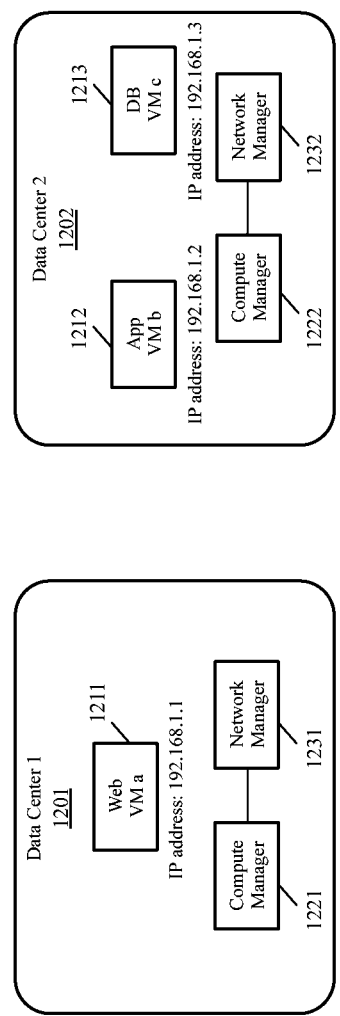
FIG. 12 conceptually illustrates a tenant with a set of VMs that implement a three-tiered architecture in some embodiments.

FIG. 12 conceptually illustrates a tenant with a set of VMs that implement a three-tiered architecture in some embodiments. The three tiers are presentation (e.g., web) tier, application tier, and data tier. Each tier is typically developed and maintained independently and on separate platforms. In the example of FIG. 12, the VMs that implement the three-tiered system span across two data centers 1201 and 1202. Data center 1201 is managed by compute manager server 1221 and network manager server 1231. Data center 1202 is managed by compute manager server 1222 and network manager server 1232. VM a 1211 implements a web server, VM b 1212 implements an application server, and VM c 1213 implements a database server.

VM a 1211 has the IP address 192.168.1.1, VM b 1212 has the IP address 192.168.1.2, and VM a 1213 has the IP address 192.168.1.3. Consider a firewall rule that specifies: "VM a to VM b any allow". If this firewall rule was placed in a local security group and was translated by network manager 1231, network manager 1231 would not be able to translate VM b to an IP address since VM b is not a local name for network manager 1231. Similarly, network manager 1232 would not be able to translate VM a to an IP address since VM a is not a local name for network manager 1232. As a result, if the rule was placed in a local firewall section, the rule should have been written in terms of static IP addresses: "192.168.1.1 to 192.168.1.2 allow".

To prevent forcing a tenant to use static IP addresses for firewall rules, some embodiments place the firewall rules in global firewall sections and utilize a translation process that is capable of accessing inventory of compute and network managers across different data centers and resolving VM names to IP addresses across multiple data centers.

Figure 13:
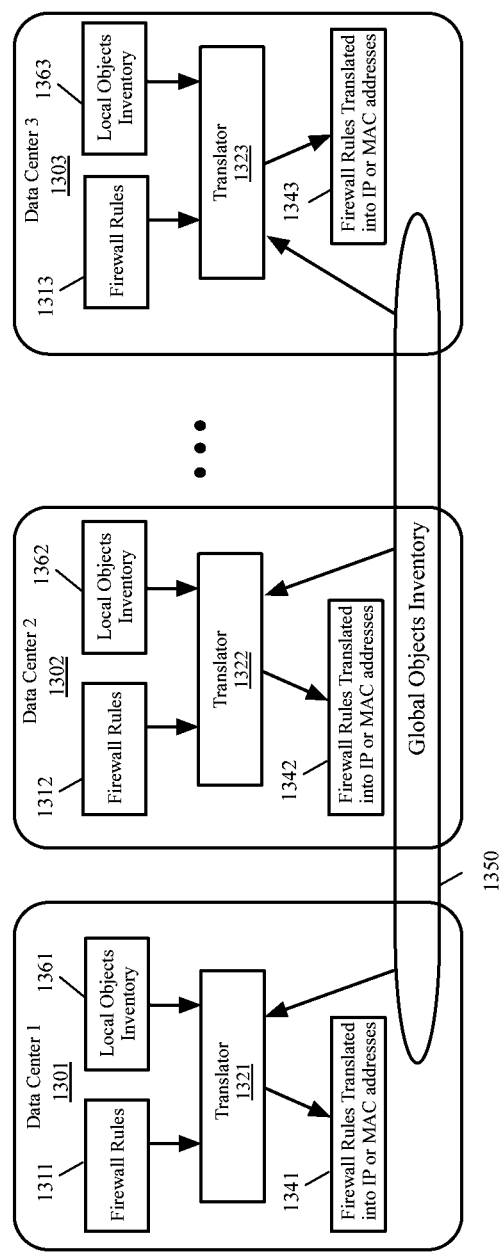
FIG. 13 conceptually illustrates translation of firewall rules that refer to objects across several data centers in some embodiments.

FIG. 13 conceptually illustrates translation of firewall rules that refer to objects across several data centers in some embodiments. The figure shows several data centers 1301-1303. Each data center includes a translator 1321-1323. Translator 1321 receives firewall rules 1311. The translator resolves local objects by searching the local objects inventory 1362 to resolve the rules, for example, to a globally recognized IP address or a MAC address. If the object is not in the local object inventory 1362, the translator searches a global inventory object 1350 to resolve the rules, for example, to a globally recognized IP address or a MAC address 1341. The local object inventories 1361-1363 and global objects inventory 1350 in some embodiments provide the mapping of the objects to the corresponding globally recognized IP address, MAC address, etc.

Similarly, translators 1322 and 1323 translate the firewall rules 1312-1323 into rules 1342-1343 that refer to IP or MAC addresses. Translators 1322 and 1323 utilize the corresponding local objects inventory 1362-1363 or the global objects inventory 1350 to translate the firewall rules 1312-1313.

Some embodiments use global firewall sections, which allow multiple network managers to share, replicate and remain in sync for distributed firewall rules or part of the rule configuration. The global firewall sections contain the rules that are to be replicated across multiple network managers. The grouping constructs used in rules defined in global sections are replicated and remain synchronized across data centers. Examples of supported grouping constructs for source, destination, AppliedTo tuples are: security groups, IPAddress/CIDR blocks, IPSets, MAC Addresses, MACSets, and grouping constructs defined using VM Names, which are locally resolvable. Further examples of the grouping constructs that are included in the global sections are provided below in the Section titled "Objects used in Global Sections.

Some embodiments provide APIs to export, import, and synchronize the global sections. The APIs contain the grouping constructs definitions. Firewall session states for live sessions are transferred during live VM migrations as described above by reference to FIG. 1-5.

Figure 14:
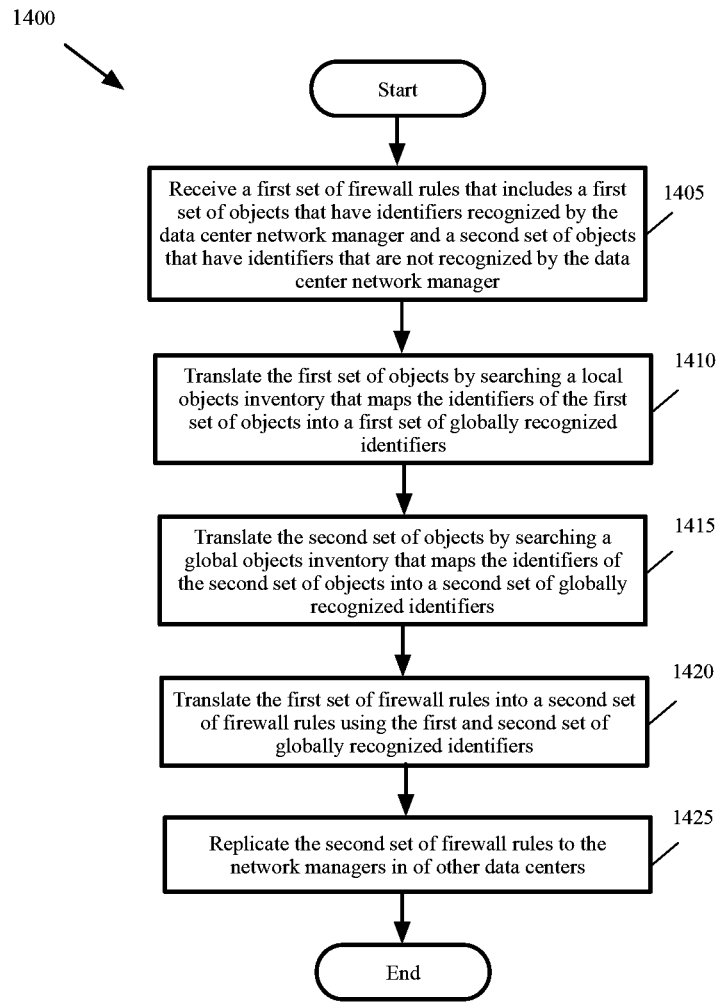
FIG. 14 conceptually illustrates a process for translating the firewall rules in some embodiments.

FIG. 14 conceptually illustrates a process 1400 for translating the firewall rules in some embodiments. In some of these embodiments, process 1400 is performed by a translator such as translator 1321 in FIG. 13. As shown, the process receives (at 1405) a first set of firewall rules (e.g., firewall rules 1311 in FIG. 13). The first set of firewall rules include a first set of objects that have identifiers that are recognized by the data center network manager and a second set of objects that have identifiers that are not recognized by the data center network manager.

The process translates (at 1410) the first set of objects by searching a local objects inventory (e.g., local objects inventory 1361 in FIG. 13) that maps the identifiers of the first set of objects into a first set of globally recognized identifiers. The process then translates (at 1415) the second set of objects by searching a global objects inventory (e.g., global objects inventory 1350 in FIG. 13) that maps the identifiers of the second set of objects into a second set of globally recognized identifiers.

The process then translates (at 1420) the first set of firewall rules (e.g., firewall rules 1311 in FIG. 13) into a second set of firewall rules (e.g., firewall rules 1341 in FIG. 13) using the first and second set of globally recognized identifiers. The process then replicates the second set of firewall rules to the network managers of other data centers (e.g., network managers of data centers 1302 and 1303 in FIG. 13). The process then ends.

Figure 15:
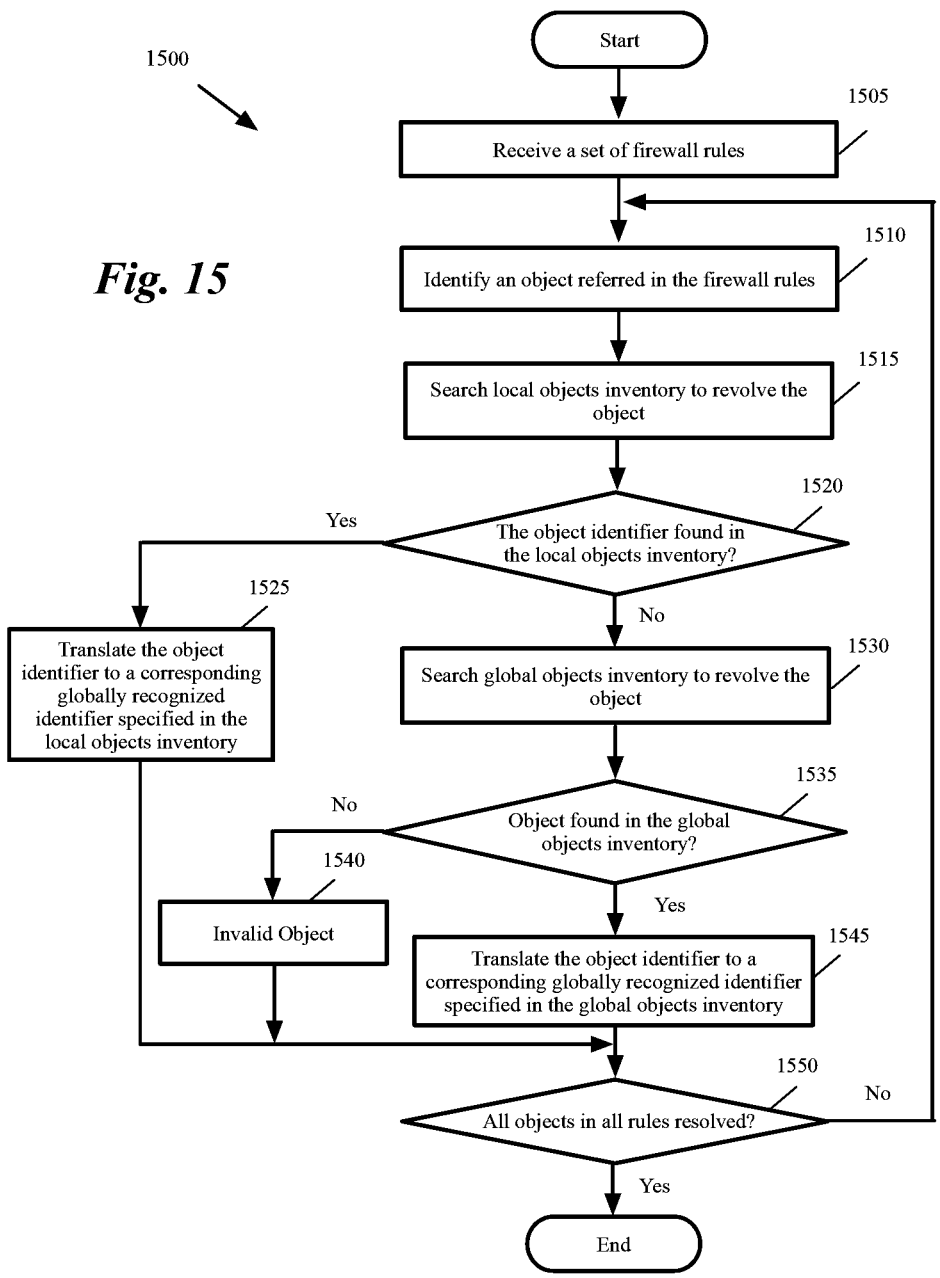
FIG. 15 conceptually illustrates a detailed process for translating the identifiers of the objects used in firewall rules in some embodiments.

FIG. 15 conceptually illustrates a detailed process 1500 for translating the identifiers of the objects used in firewall rules in some embodiments. In some of these embodiments, process 1500 is performed by a translator such as translator 1321 in FIG. 13.

As shown, the process receives (at 1505) a set of firewall rules. The process identifies (at 1510) an object refereed in a firewall rule. The process then searches (at 1515) the local objects inventory (e.g., local objects inventory 1361 shown in FIG. 13). The process then determines (at 1520) whether the identifier of the object is found in the local objects inventory.

If not, the process proceeds to 1530, which is described below. Otherwise, the process translates (at 1525) the object identifier to a corresponding globally recognized identifier specified in the local objects inventory. The process then proceeds to 1550, which is described below.

When the object is not found in the local objects inventory, the process searches (at 1530) the global object inventory (e.g., local objects inventory 1350 shown in FIG. 13). The process then determines (at 1535) whether the identifier of the object is found in the global objects inventory. If not, the process identifies (at 1540) the object as an invalid object. The process in some embodiments proceeds to 1550, which is described below. In other embodiments, the process ends once the first invalid object is encountered.

When the object is found in the global objects inventory, the process translates (at 1545) the object identifier to a corresponding globally recognized identifier specified in the global object inventory. The process then determines (at 1550) whether all objects in all rules are resolved. If yes, the process ends. Otherwise, the process proceeds to 1510 to identify the next unresolved object in the firewall rules.

C. Objects Used in Global Sections

The followings are examples of the objects (or grouping constructs) used in global sections described in Sections I and II: Inline/static/raw IP Addresses such as individual IP addresses, IP Subnets, and IP Ranges; Inline/static/raw MAC Addresses IPSets containing static IP addresses definition; MACSets containing static MAC addresses definition; Security groups (without identifier based members) such as security groups based on VM name; Global logical wires which are stretched across datacenters; Nested security groups, i.e., security groups that have other static grouping objects as members (e.g., security groups with IPSets as members, security groups with MACSets as members, security groups with security group, without identifier based members, as members); applications/services; application groups/service groups; and compute manager objects.

D. Grouping Constructs Consumption in Firewall Rules

The following are examples of the grouping constructs that are supported in firewall source field: Inline/Static/Raw IP Addresses; Inline/Static/Raw MAC Addresses; IPSets; MACSets; security group (with static definition), nested security groups (with static definition); and compute manager objects.

The following are examples of the grouping constructs that are supported in firewall destination field: Inline/Static/Raw IP Addresses; Inline/Static/Raw MAC Addresses; IPSets; MACSets; security group (with static definition); nested security groups (with static definition); and compute manager objects.

The following are examples of the services that are supported: Services and service group. The following examples of the objects that are supported in the AppliedTo field: compute manager objects and global logical wires.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
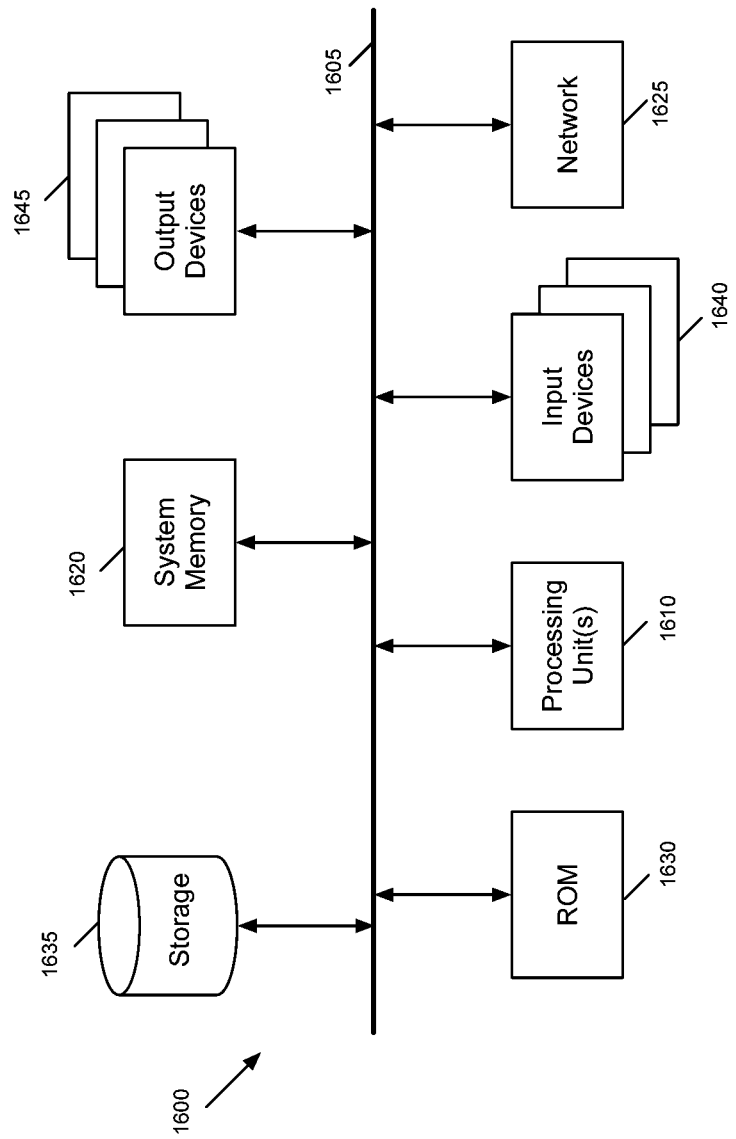
FIG. 16 conceptually illustrates an electronic system with which some embodiments of the invention are implemented.

FIG. 16 conceptually illustrates an electronic system 1600 with which some embodiments of the invention are implemented. The electronic system 1600 can be used to execute any of the control, virtualization, or operating system applications described above. The electronic system 1600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1600 includes a bus 1605, processing unit(s) 1610, a system memory 1620, a read-only memory (ROM) 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1620, and the permanent storage device 1635.

From these various memory units, the processing unit(s) 1610 retrieve instructions to execute and data to process in order to execute the processes of the invention. The processing unit(s) may be a single processor or a multi-core processor in different embodiments.

The read-only-memory 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash drive, etc.) as the permanent storage device. Like the permanent storage device 1635, the system memory 1620 is a read-and-write memory device. However, unlike storage device 1635, the system memory is a volatile read-and-write memory, such as random access memory. The system memory stores some of the instructions and data that the processor needs at runtime. In some embodiments, the invention's processes are stored in the system memory 1620, the permanent storage device 1635, and/or the read-only memory 1630. From these various memory units, the processing unit(s) 1610 retrieve instructions to execute and data to process in order to execute the processes of some embodiments.

The bus 1605 also connects to the input and output devices 1640 and 1645. The input devices enable the user to communicate information and select commands to the electronic system. The input devices 1640 include alphanumeric keyboards and pointing devices (also called "cursor control devices"). The output devices 1645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 2, 5, 7, 8, 14, and 15) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of replicating firewall rules across a plurality of data centers, each data center comprising a set of hosts and a network manager, each host configured to host a set of data compute nodes (DCNs), the method comprising:
   identifying a first DCN on a host in a primary data center, the first DCN associated with a set of global firewall rules utilizing unique identifiers recognized by the network manager of each data center;
   allocating storage for a second DCN on a host in a secondary data center to replicate the first DCN;
   prior to the second DCN being powered on, replicating the set of global firewall rules associated with the first DCN into the storage allocated for the second DCN; and
   in response to receiving an indication that the second DCN is powered on, and enforcing the set of global firewall rules for the second DCN using the replicated set of global firewall rules.

2. The method of claim 1, wherein the second DCN is utilized as a recovery DCN, wherein the second DCN is powered on after the first DCN is powered down.

3. The method of claim 1, wherein the set of global firewall rules is a first set of global firewall rules, the method further comprising:
   receiving a second set of global firewall rules associated with the first DCN prior to the second DCN being powered on; and
   prior to the second DCN being powered on, replicating the second set of global firewall rules associated with the first DCN into the storage allocated for the second DCN.

4. The method of claim 1, wherein each global firewall rule includes (i) a set of n-tuples for comparing with a set of attributes of a packet to determine whether a firewall rule is applicable to the packet, and (ii) an action identifier that specifies an action to perform on the packet when the firewall rule is applicable to the packet.

5. The method of claim 4, wherein each global firewall rule further includes an enforcement-node tuple.

6. The method of claim 1, wherein the set of global firewall rules are utilized as read-only rules in the secondary data center.

7. The method of claim 1, wherein a DCN is a virtual machine.

8. A non-transitory machine readable medium storing a program that when executed by at least one processing unit replicates firewall rules across a plurality of data centers, each data center comprising a set of hosts and a network manager, each host configured to host a set of data compute nodes (DCNs), the program comprising sets of instructions for:
   identifying a first DCN on a host in a primary data center, the first DCN associated with a set of global firewall rules utilizing unique identifiers recognized by the network manager of each data center;
   allocating storage for a second DCN on a host in a secondary data center to replicate the first DCN;
   replicating, prior to the second DCN being powered on, the set of global firewall rules associated with the first DCN into the storage allocated for the second DCN; and
   enforcing, in response to receiving an indication that the second DCN is powered on, the set of global firewall rules for the second DCN using the replicated set of global firewall rules.

9. The non-transitory machine readable medium of claim 8, wherein the second DCN is utilized as a recovery DCN, wherein the second DCN is powered on after the first DCN is powered down.

10. The non-transitory machine readable medium of claim 8, wherein the set of global firewall rules is a first set of global firewall rules, the program further comprising sets of instructions for:
    receiving a second set of global firewall rules associated with the first DCN prior to the second DCN being powered on; and
    replicating, prior to the second DCN being powered on, the second set of global firewall rules associated with the first DCN into the storage allocated for the second DCN.

11. The non-transitory machine readable medium of claim 8, wherein each global firewall rule includes (i) a set of n-tuples for comparing with a set of attributes of a packet to determine whether a firewall rule is applicable to the packet, and (ii) an action identifier that specifies an action to perform on the packet when the firewall rule is applicable to the packet.

12. The non-transitory machine readable medium of claim 11, wherein each global firewall rule further includes an enforcement-node tuple.

13. The non-transitory machine readable medium of claim 8, wherein the set of global firewall rules are utilized as read-only rules in the secondary data center.

14. The non-transitory machine readable medium of claim 8, wherein a DCN is a virtual machine.

15. A system comprising:
    a plurality of data centers, each data center comprising:
        a network manager;
        a set of hosts configured to host a set of data compute nodes (DCN); and
        a site recovery manager configured to:
            identify a first DCN on a host in a primary data center, the first DCN associated with a set of global firewall rules utilizing unique identifiers recognized by the network manager of each data center;
            allocate storage for a second DCN on a host in a secondary data center to replicate the first DCN;
            replicate, prior to powering on the second DCN, the set of global firewall rules associated with the first DCN into the storage allocated for the second DCN; and
            enforce, in response to receiving an indication that the second DCN is powered on, the set of global firewall rules for the second DCN using the replicated set of global firewall rules.

16. The system of claim 15, wherein enforcing the set of global firewall rules comprises enforcing the set of global firewall rules through the network manager of the secondary data center.

17. The system of claim 15, wherein the second DCN is utilized as a recovery DCN, wherein the second DCN is powered on after the first DCN is powered down.

18. The system of claim 15, wherein the set of global firewall rules is a first set of global firewall rules, the site recovery manager further configured to:
   receive a second set of global firewall rules associated with the first DCN prior to the second DCN being powered on; and
   replicate, prior to the second DCN being powered on, the second set of global firewall rules associated with the first DCN into the storage allocated for the second DCN.

19. The system of claim 15, wherein each global firewall rule includes (i) a set of n-tuples for comparing with a set of attributes of a packet to determine whether a firewall rule is applicable to the packet, and (ii) an action identifier that specifies an action to perform on the packet when the firewall rule is applicable to the packet.

20. The system of claim 19, wherein each global firewall rule further includes an enforcement-node tuple.

21. The system of claim 15, wherein the set of global firewall rules are utilized as read-only rules in the secondary data center.

22. The system of claim 15, wherein a DCN is a virtual machine.

* * * * *